United States Patent [19]

Noll et al.

[11] Patent Number: 5,105,422
[45] Date of Patent: Apr. 14, 1992

[54] CIRCUIT ARRANGEMENT FOR INFORMATION TRANSMISSION

[75] Inventors: Joachim J. Noll, Quickborn; Franz X. Meyer, Greding; Dieter A. H. Riekmann, Pinneberg, all of Fed. Rep. of Germany

[73] Assignee: U.S. Philips Corporation, New York, N.Y.

[21] Appl. No.: 373,352

[22] Filed: Jun. 28, 1989

[30] Foreign Application Priority Data

Jul. 1, 1988 [DE] Fed. Rep. of Germany ....... 3822263

[51] Int. Cl.$^5$ ............................ H04J 3/06; H04J 3/14; H04L 7/04
[52] U.S. Cl. .................................. 370/110.1; 370/13; 370/105.1; 371/5.4
[58] Field of Search ................... 370/110.1, 82, 13, 24, 370/29, 58.1, 58.2, 58.3, 60, 60.1, 67, 77, 79, 80, 83, 85.1, 85.9, 85.11, 94.1, 94.2, 100.1, 105.1, 105.2, 105.4, 106; 340/825.03, 825.06, 825.14; 379/93, 94; 371/5.1, 5.4, 47.1; 375/106, 111, 112, 114

[56] References Cited

U.S. PATENT DOCUMENTS

| | | | |
|---|---|---|---|
| 4,597,073 | 6/1986 | Staples | 370/24 |
| 4,607,364 | 8/1986 | Neumann et al. | 370/110.1 |
| 4,730,302 | 3/1988 | Fuerlinger et al. | 370/13 |
| 4,792,800 | 12/1988 | Fujioka | 370/110.1 |
| 4,794,595 | 12/1988 | Ohyama | 370/110.1 |
| 4,965,795 | 10/1990 | Coffelt et al. | 370/110.1 |

FOREIGN PATENT DOCUMENTS 2351478 4/1975 Fed. Rep. of Germany.
2643149 3/1978 Fed. Rep. of Germany.

OTHER PUBLICATIONS

Siemens, "ICs for Telecommunications".

Primary Examiner—Douglas W. Olms
Assistant Examiner—Alpus H. Hsu
Attorney, Agent, or Firm—Anne E. Barschall

[57] ABSTRACT

In the ISDN system complex line adapting circuits are provided on the two sides of the transmission line and they handle an extensive protocol. These circuits are divided into two sub-circuits connected to one another over fixed interfaces. The sub-circuit which is located nearest to the transmission line, however, is to have a considerably varying structure depending on the transmitting medium. For a modular structure it is now proposed to subdivide this sub-circuit into two partial circuits interconnected over a newly created simple binary interface. Thus, only the partial circuit which is located nearest to the transmission line needs to be specifically designed for the transmitting medium, for example, glass fibre lines, whereas the protocol management is performed in the other partial circuit, which always has the same structure irrespective of the transmitting medium. In addition, an efficient frame structure of the newly created binary interface is devised, wherein the data supplied by the other sub-circuit are converted and also the transmission error messages are processed.

12 Claims, 2 Drawing Sheets

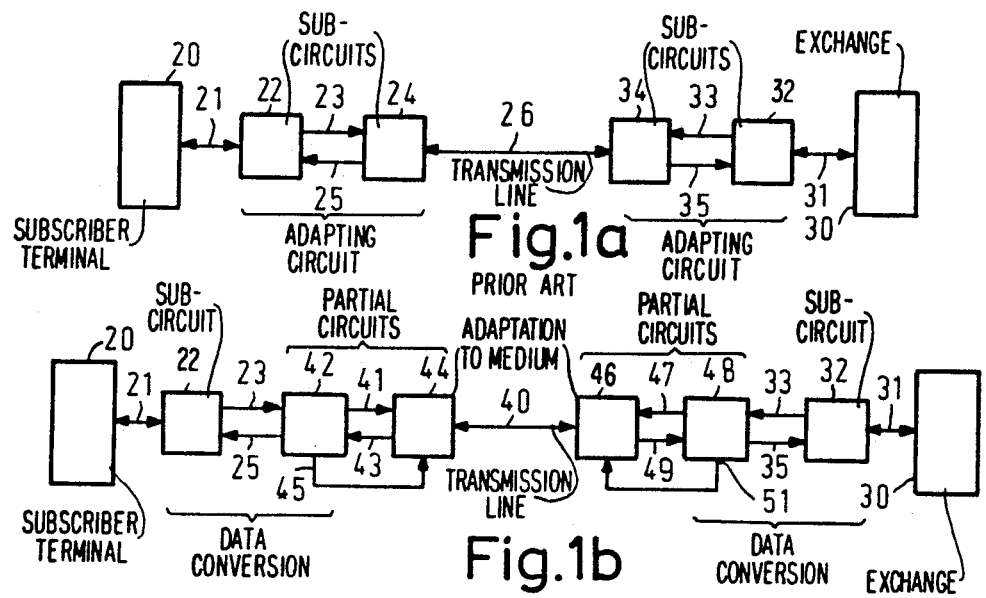
Fig.1a PRIOR ART
Fig.1b
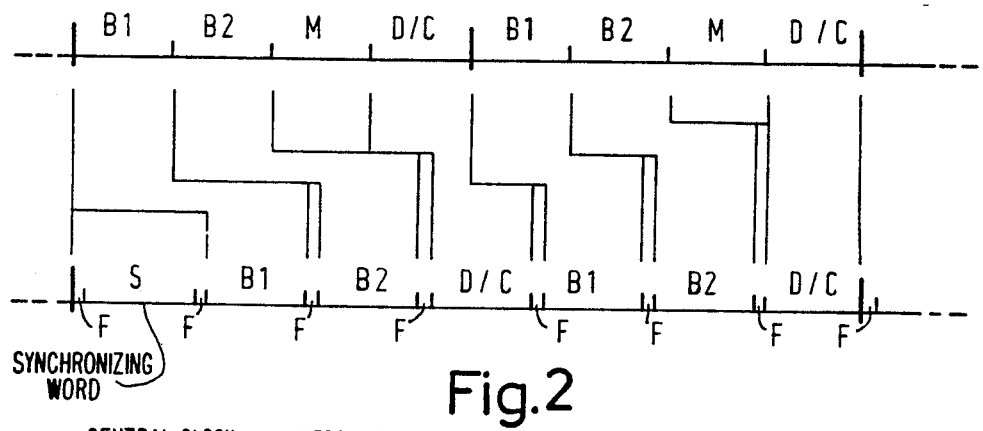
Fig.2
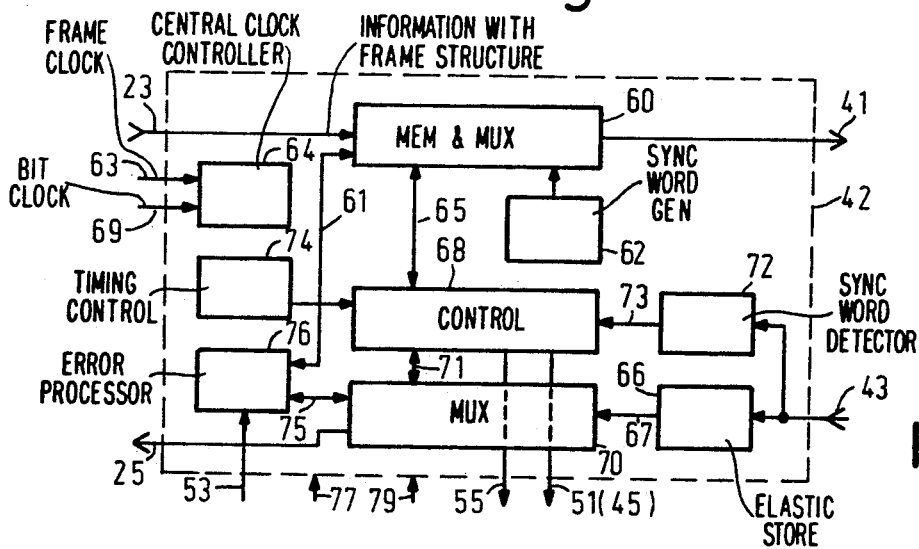
Fig.3

CIRCUIT ARRANGEMENT FOR INFORMATION TRANSMISSION

BACKGROUND OF THE INVENTION

1. Field of the Invention

The invention relates to a circuit arrangement for transmitting information between at least a subscriber terminal and an exchange over a transmission line connected to the terminal and the exchange by means of adapting circuits, the adapting circuits each comprising two sub-circuits interconnected via a modular first interface and of which the first sub-circuit which is located nearest to the transmission line is essentially the same for the two adapting circuits and comprises the physical adaptation to the transmitting medium.

2. Related Art

Such a circuit arrangement for a so-called ISDN communications network is, for example, known from the brochure of SIEMENS "ICs for Telecommunications, IOM, ISDN Oriented Modular Interface, Interface Description". In the above brochure specifically the first interface between the two sub-circuits is described. The first sub-circuit is then especially arranged for a copper cable as a transmitting medium and transmits through this cable the digital information as ternary signals and comprises the converting circuits and line amplifiers required for that purpose. This sub-circuit further includes processing and converting arrangements for processing the control signals transmitted over the first interface and converting the data also transmitted over this interface into the ternary line signals and vice versa, so that the first sub-circuit has a complex structure. When employing a glass fibre link as a transmitting medium, a novel sub-circuit of a similarly complicated structure has to be developed.

SUMMARY OF THE INVENTION

It is an object of the invention to provide a circuit arrangement of the type set forth in the opening paragraph which allows to be adapted with little circuitry and cost to various transmitting medium, specifically glass fibre lines.

This object is achieved, according to the invention, in that the first sub-circuit comprises two partial circuits interconnected over a second interface and of which the first partial circuit converts the information of the first interface into a binary send signal for the second interface and a binary receive signal of the second interface into the form required for the first interface, and the second partial circuit is arranged specifically for the transmitting medium and drives same by means of the binary send signal of the second interface and forms the binary receive signals for the second interface from the signals of the transmitting medium.

Owing to the subdivision of the first sub-circuit into two partial circuits it is thus achieved that for various transmitting medium only a corresponding second partial circuit is to be used which has a simple structure, however, because the newly created second interface between the two partial circuits transmits only the direct send and receive information as binary information, whereas the complex processing of the information of the first interface takes place in the first partial circuit which, henceforth, is independent of the transmitting medium.

The circuit arrangement according to the invention is employed in an ISDN communications network. It is known from the brochure mentioned hereinbefore to organize the information transmitted over the first interface is organised in sequential first frames. Each first frame comprising various data words which each forms an information channel, of which at least a single channel, is a control channel and comprises control information. The frame structure of the information transmitted over the interface is determined by frame clock signals accordingly transmitted together with the information. Such a control of the frame structure, however, is not readily possible with the information transmitted over the second interface so that the frame structure is to be formed in a different way. An embodiment of a circuit arrangement according to the invention is efficient to the effect that the first partial circuit converts for the second interface the information transmitted over the first interface into second frames differing from a first frame, whose lengths are a multiple of the length of the first frame, and in which at least part of the control information is suppressed, and in which at least one preset location contains synchronising information. In this context it is taken into account that part of the control information comprised in the information transmitted over the first interface is used only for control measures in the first partial circuit, so that this information does not have to be transmitted over the second interface. In its stead a frame conversion is used such that henceforth synchronising information rather than the suppressed control information is available in the frame transmitted over the second interface and thus also via the transmitting medium. The reconstruction of the frame structure for the first interface is then effected in the second partial circuit.

In the prior-art circuit arrangement to be used in the ISDN communications network, in which the first frame contains two useful channels and two control channels each one of them having equally long data words, from which the one control channel transmits first control information for controlling preset functions of the first partial circuit, a further embodiment of the invention is efficient in that the length of the second frame is an integer multiple of the length of the first frame and in that each frame contains this multiple of the data words of the useful channels and of the second control channel as well as synchronising information. In this manner the clock frequency and bit frequency in the two interfaces are equal.

The synchronising information is to be formed such that when the first synchronising information is received, frame synchronisation should be possible forthwith during transmission, that is to say, the synchronising information is to be unambiguous and may not be simulated by useful information. For this purpose, it is efficient that a bit having one binary value is inserted between two consecutive data words and also between these data words and a synchronising word which is the same in all frames and that the synchronising word is at least one bit longer than each data word and comprises only bits having the other binary value. In fact, in DE-PS 23 51 478 it is disclosed that pulses having a predetermined value are inserted between the data words of a frame, so that first a synchronisation with these inserted pulses can be effected as a result of which the boundaries of the individual data words in the frame are known. Since the frame synchronising word can only be copied by useful information, the frame synchronising word is to be received several times consecutively according to prior-art methods before the frame synchronisation is realised. DE-OS 26 43 149 further discloses that the synchronising word is to be longer than the other data words in order to be able to form thus a unique bit combination. According to the above embodiment of the circuit arrangement according to the invention it is possible, though, to let the synchronising word be slightly longer than a data word so as to have unique synchronising information which cannot be copied by useful information.

The second partial circuit connected to the transmitting medium contains the amplifiers required for transmitting the information over the transmitting medium, which amplifiers generally consume considerable electric power and generate heat. In order to limit both effects it is efficient according to a further embodiment of the invention that the first partial circuit generates an activating signal at a separate connection point when first preset control information occurs in the control channel and transmits this signal over a further link to the second partial circuit, specifically for switching-on transmitting medium comprised therein. As appears from the above brochure of Siemens, from the procedures for setting up connections initiated both by the subscribers and by the exchange, the first partial circuit will always receive information over the first interface which signalises the start of a transmission so that this partial circuit can simply produce an activating signal from this information.

Accordingly it is efficient that the first partial circuit generates at least a further control signal at the occurrence of second preset control information in the control channel and feeds this signal to a further separate connection point. Such further control signals can be used advantageously, for example, for switching a loop, so as to be able to localise an error in a better way. Essentially, it will thus be sufficient to produce only a further control signal in order to keep the circuitry and the number of connection points of the first partial circuit the smallest possible. In order to have more control signals in certain cases or have them available at specific locations where the first and the second partial circuits are spaced wider apart, it is efficient that the first partial circuit can be switched into a monitor mode of operation for evaluating only the receive signals of the second interface. In this case the first partial circuit does not operate as a converter between the first and second interfaces, but only as a control signal generator. For this purpose, no special module of a different structure will then be required.

With each transmission it is possible that errors occur. A complete failure of a transmission section, for example, as a result of a disconnection, can be discovered rather easily. However, it does happen that errors occur only occasionally, which also has to be detected and evaluated. For this purpose, it is efficient that the first partial circuit comprises a separate error input terminal and an error counter which receives via the separate error input terminal at least from the second partial circuit the error signals produced therein when transmission errors are detected and counts these error signals, and whose count can be read out and erased over the control channel of the first interface by means of third predetermined control information received via this first interface. The second partial circuit can detect transmission errors in the received signal, for example, by verifying specific code instructions. If the count is read out and evaluated periodically, already the beginning of a serious disturbance in the transmission section can be timely established.

The evaluation of the number of errors per time unit is essentially only possible on the side of the exchange, as practically only from this side measures can be taken for further examination of the errors. However, in order to be able to evaluate errors occurring during transmission also at the subscriber end it is efficient that the first partial circuit comprises an error counter counting at least each error control signal received via the second interface, and whose count can be read out and erased over the control channel of the first interface by means of third predetermined control information received via this first interface. This error control signal received in the control channel is thus generated and transmitted at the subscriber end so that the errors are summed only at the exchange and evaluated there. In the partial circuit at the subscriber end the error counter is not used. This saves on transmitting an error count over the transmission section because no position is provided in the control channel for such error count information in the frame structure of the transmitted information.

In the first partial circuit a separate error counter can be used for counting the errors in each exchange and at each subscriber end. For localising the position of the error, however, this is not particularly convincing, but this error position has to be established with other prior-art means. Therefore, it is efficient that only a single error counter is provided counting both the error signals and the error control signals. Consequently, also the errors in the whole transmission section including the adapting circuits are summed up in common.

The functions to be performed by the first partial circuits at the exchange and at the subscriber end are slightly different. For this purpose, it is efficient that the first partial circuit can be switched to one of two further modes of operation in addition to the monitor mode of operation, whilst in the EX-mode, as one further mode of operation, the error counter can be switched and read out and in an NT-mode, as the other mode of operation, an error signal supplied by the second partial circuit can be converted into an error-control signal on the control channel of the second interface. The switching or setting respectively, to one of these modes of operation can be effected, for example, because extra connection points are provided forming fixed connections to signal voltages, depending on the location at which the partial circuit is inserted. Besides error signal processing still further different functions can be incorporated.

BRIEF DESCRIPTION OF THE DRAWING

Embodiments of the invention will be further explained hereinafter with reference to the drawing figures, in which:

FIGS. 1a and 1b show in a conventional way a complete transmission section between a subscriber connection point and an exchange and in accordance with the invention, FIG. 2 shows an example of a conversion of the frame structure of the first interface into another frame structure of the second interface, FIG. 3 shows a block diagram of a second partial circuit.

DETAILED DESCRIPTION OF THE PREFERRED EMBODIMENT

Figure 4:
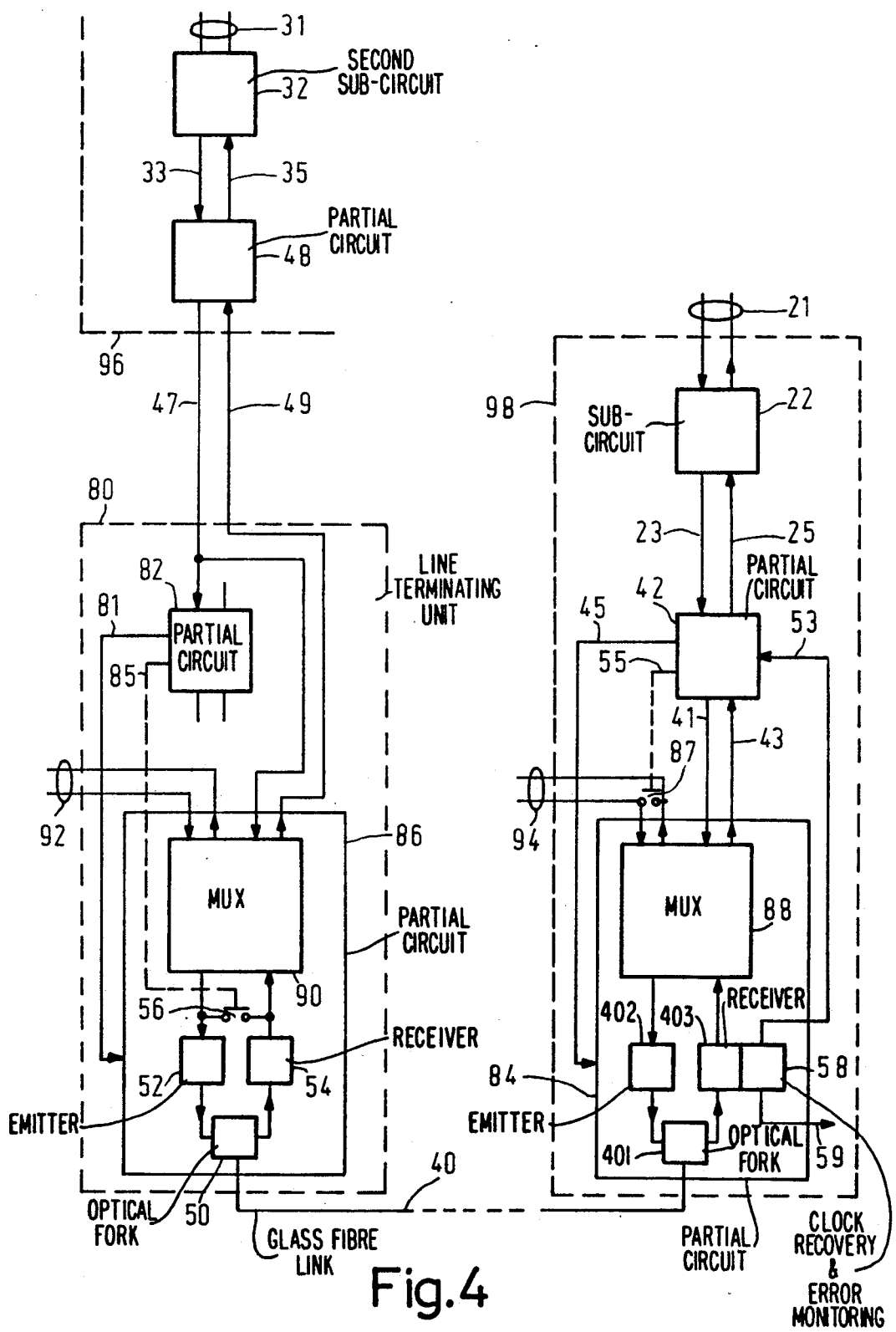
FIG. 4 shows the block diagram of an arrangement for wideband traffic and comprising a switched-off second partial circuit.

FIG. 1a shows the connection between a subscriber terminal symbolically represented by the block 20 and an exchange indicated by the block 30. The spatial distance between subscriber 20 and exchange 30 is essentially covered by the transmission line 26, here in the form of a copper cable which is specifically assumed to be in the form of a conventional two-wire line. At the two ends the transmission line 26 is terminated by adapting circuits, on the one side indicated by the blocks 22 and 24 and on the other by the blocks 32 and 34. The adapting circuit 22/24 is connected to the subscriber terminal 20 by means of a line 21, which is conventionally arranged as a four-wire line. Accordingly, the exchange 30 is connected to the adapting circuit 32/34 by means of the line 31.

The adapting circuits on the two sides of the transmission line 26 each comprise two sub-circuits 22, 24 and 32, 34 respectively, from which each first sub-circuit 24 and 34 respectively, has an identical structure on both sides of the line, whereas the respective second sub-circuits 22 and 32 are especially arranged for the subscriber end and the exchange respectively. The sub-circuits 22, 24 and 32, 34 respectively, belonging together, are interconnected over an interface which is formed by the lines 23, 25 and 33, 35 respectively. The arrangement of the data transmitted over this interface is the same for the two adapting circuits 22/24 and 32/34, as a result of which the first sub-circuits 24 and 34 can actually have identical structures.

The data transmitted over each of these lines have a frame structure which is shown in the top part of FIG. 2. FIG. 2 shows two consecutive frames, each of which comprising four data words which are eight bits long in this case. The order of each data word in consecutive frames conventionally represents a channel. The data words B1 and B2 belong to two useful channels through which information is transmitted from the subscriber station to the exchange and vice versa. Each frame further includes a monitor channel M through which the control information is transmitted which is provided for controlling the first sub-circuit by means of the second sub-circuit and vice versa. In addition, a further control channel D/C is provided, whilst several bits of the data words of this channel are also used for transmitting narrow-band additional information over the transmission line 26. The D/C channel actually represents a further useful information channel on the transmission line 26, whereas the channel M comprises mainly data, which are important only within each adapting circuit and transmitted over the transmission line 26 only for simplicity.

The first sub-circuits 24 and 34 on the two sides of the transmission line 26 also include the adapting circuits for the transmission line, for example, the line driver units when the transmission line 26 is arranged as a two-wire line. Moreover, the first sub-circuits comprise equalizing circuits, specifically echo cancellers for the two-wire line 26, through which the information is transmitted simultaneously in both directions in a ternary code, so as to make better use of the useful bandwidth of the copper cable of the transmission line 26.

Now, if the transmission line is to be exchanged for a glass fibre link, the first sub-circuits 24 and 34 respectively, can no longer be used, but new sub-circuits are to be developed, comprising not only the light emitter and the light receiver for the two glass fibres of the transmission line, but also the further circuits for processing the control information transmitted over the interfaces 23, 25 and 33, 35 respectively, which can essentially be distinguished from one another only by means of the information transmitted through the monitor channel if a copper wire line is used.

A change in the subdivision of the adapting circuits into sub-circuits is not possible without any further measures, because the functions of the second sub-circuits 22 and 32 and the data structure and frame structure of the data respectively, at the interface between the two sub-circuits is practically fixed for each adapting circuit.

FIG. 1b shows only one arrangement in which the first sub-circuit which is located nearest to the transmission path is subdivided into two partial circuits 42, 44 and 46, 48 respectively, which are interconnected by a second interface by means of the lines 41, 43 and 47, 49 respectively. Over this second interface the information is transmitted as a binary signal in the form, that is, in an arrangement of data words, as will be transmitted over the transmission link 40. In the partial circuits 44 and 46 no conversion of the sequence of the information data takes place, but only an adaptation to each transmitting medium, for example, to copper wire lines or glass fibre lines or the like.

At the first interface, for example, of the sub-circuit 22 and the partial circuit 42 the frame structure of the data transmitted over the lines 23 and 25 respectively, is controlled by additional signals over separate lines. Such additional control signals over separate lines are to be avoided with the second interface so that other measures for showing the frame structure, that is, for synchronising the frames, are required. These measures consist of the fact that specific synchronising information is inserted into the data transmitted over the second interface which sync information is generated in the partial circuit 42 and evaluated by the partial circuit 48 or vice versa. Alternatively, as the information of the monitor channel is not to be transmitted over the transmission link, this information is omitted at the second interface. The data transmitted over the second interface thus have a frame structure as represented in FIG. 2 at the bottom.

As can be recognised therefrom, two frames with the two channels B1 and B2 and the control channel D/C of the first interface are always converted into one frame of the second interface, which thus has twice the length of the first frame. This second frame contains a synchronising word S as well each of the channels B1, B2 and D/C. Between each channel as well as between these words and the synchronising word a filling bit F of a specific binary value is inserted. Furthermore, the synchronising word S is one bit longer than the data words, that is, nine bits long. Together with the six data words of eight bits each and the seven filling bits F there will thus be a number of information bits in a bottom frame which is equal to the number of information bits in the two frames represented in the top half of FIG. 2, so that at the inputs and outputs of the second partial circuits 42 and 48 respectively, that is, at the two interfaces, the bit frequencies are the same.

The filling bits F all have the same binary value, for example, the binary value "1" whereas all bits of the synchronising word S have the opposite binary value, that is, the binary value "0" in this case. Consequently, the synchronising word S is unique, that is to say, on reception it can be recognised forthwith because a sequence of nine bits having the value "0" embedded by one bit each having the value "1" is searched for. Such a sequence cannot be simulated by the information of the remaining channels, for in each channel only a single data word having a maximum number of eight bits of the binary value "0" may occur after which a filling bit of the binary value "1" will always appear. Since the synchronising word is located at the beginning of a frame, the data words in the first transmitted frame at the beginning of a transmission can be determined and allocated unambiguously.

The partial circuits 44 and 46 assigned to the transmission link 40 are only to convert the information from the second interface into the signals suitable for the transmitting medium or, conversely, the signals received from the transmitting medium into binary electric signals. In the case of a glass fibre link for a transmission link 40 the arrangements 44 and 46 comprise each at least a laser diode which consumes a considerable amount of energy and produces heat also when it is not in a driven state. In order to save on this energy in the intervals during which no transmission takes place an additional line 45 from the first partial circuit 42 to the second partial circuit 44 is provided and, accordingly, a line 51 from the partial circuit 48 to the partial circuit 46. Prior to transmission an activating signal is transmitted through these lines to the circuits 44 or 46 respectively, so as to switch on the laser diodes in the respective circuits or adjust these diodes to their normal operating points. If the transmission link 40 consists of, for example, a copper wire line, the activating signal on the line 45 or 51 respectively, will switch on the line driver unit and set it to its operating point.

FIG. 3 shows an embodiment of a first partial circuit, for example, partial circuit 42 of FIG. 1b in the form of a coarse block diagram. Over line 23 the information is applied in a frame structure as represented in FIG. 2 at the top. This information is applied to a memory and multiplexer arrangement 60, where at least part of the data of two consecutive frames is detached and buffered, which part is supplied over the line 41 in the frame structure represented in FIG. 2 at the bottom. Insofar the information supplied over the line 23 contains control data, they are applied via a link 65 to a control unit 68 controlling the protocol. The block 62 represents a sync word generator generating the synchronising word S at the beginning of each frame of the outgoing data. In addition, a central clock controller 64 receives over the line 63 from the inserted sub-circuit, that is, from the sub-circuit 22 in FIG. 1b, a frame clock signal which indicates the frame structure or beginning of the data frame on the line 23, and which also receives over the line 69 a bit clock signal. The clock lines leading from this controller 64 to the other arrangements 60 and 62 etc. are not shown in FIG. 3 for clarity.

The data received from the second partial circuit, that is, from the circuit 44 in FIG. 1b, over the line 43, are applied to a sync word detector 72 which on recognizing the synchronising word applies a corresponding sychronising signal over the line 73 to the central control unit 68. Furthermore, the data supplied over the line 43 are applied to an elastic store 66 delaying them to such an extent that the data supplied over the line 25 in their frame structure correspond in time with the frame clock on the line 63. The data synchronised thus are applied to a multiplexer 70 where, for example, the synchronising word and the filling bits are extracted and only the data words of the two useful channels B1 and B2 as well as the control channel D/C, complemented by data for the monitoring channel M, are transported to the next sub-circuit over the line 25. The data of the monitor channel are generated by the central control unit 68 and applied to the multiplexer 70 over the line 71 whereas, alternatively, at least part of the control data from the data received over the line 43 are transferred over the line 71 to the central control unit 68. The arrangement 74 comprises a timing control, monitoring the lapse of time especially at the beginning of a transmission and, for example, ensures a regular termination of the transmission when data errors occur.

The central control unit 68 evaluates in their own frame structures the control data of the two interfaces, that is, the data from the control units received over the lines 23 and line 43. With this evaluation some functions within the partial circuit 42 are controlled and, as the case may be, converted control data are inserted into the outgoing data streams, and, in addition, with specific control information, control signals are generated at outputs 51 and 55. As appears from FIG. 1b the control signal at the output 51 or the corresponding control signal at output 45 of the partial circuit 42 is used for switching on the send arrangement as well as further essential energy-consuming elements in the partial circuits 46 and 44 respectively. By means of the control signal at the output 55 further control functions can be released as will be explained hereinafter.

The partial circuit represented in FIG. 3 further includes an error processor means 76 comprising especially an error counter. This counter is incremented by error signals applied through an input 53. These error signals come into the received signal specifically from the second partial circuit, for example, when specific code measures have been implemented.

The processor means 76 is connected to the multiplexer 70 with the aid of the link 75, and, to be more precise, an error control signal in the data received over the line 43 is applied to the error counter in order to increment this counter and, alternatively, the count can be applied to the multiplexer 70 in order to insert this count over the outgoing line 25 of the first interface into a data word of the control channel. This insertion is effected by means of a control command comprised in the data applied to the multiplexer 60 over the line 23, which is applied to the error processor means 76 over the line 61. Alternatively, an error signal supplied through the input 53 can be directly applied to the error counter or the multiplexer 60 over the line 61, in order to insert a corresponding error control signal into the data transmitted over the line 41.

There are two more inputs 77 and 79 available through which a specific mode of operation of the partial circuit 42 can be set. A maximum of three modes of operation is possible from which one mode is provided as an EX-mode for operating this partial circuit at the exchange, whereas the processing of the clock signal is controlled accordingly and reading the contents of the error counter and the transmission thereof is possible. A further mode of operation is the NT-mode, which is provided for the operation of the first partial circuit at the subscriber end and at which the clock signal is derived from the received data and an error signal is transmitted as an error control signal through the control channel of the second interface. In the monitor mode, as a third mode of operation, the partial circuit as shown in FIG. 3 is essentially used only for evaluating control commands received over the second interface and for producing control signals. This has to be explained with reference to FIG. 4, which diagrammatically represents an arrangement as shown in FIG. 1b with extensions and modifications. Part of an exchange 96 is shown. This part shows the second subcircuit 32 and partial circuit 48. Circuit 32 receives data over the line 31 data from the exchanges (not shown) and supplies data thereto, as circuits 32 and 48 are interconnected by the two lines 33 and 35 which form the first interface. The two links 47 and 49, forming the second binary interface, lead to a line terminating unit 80. Herein a second partial circuit 86 is included which is connected to this second interface and generates optical signals for the glass fibre link 40 or processes the received optical signals respectively.

Since a glass fibre line has a considerably higher bandwidth than the two-wire line which has been customary so far at the subscriber end in telephone technology, the partial circuit 86 comprises a multiplexer 90 nesting and de-nesting in time respectively, the data of the second interface composed of the lines 47 and 49 with data which are supplied over a wideband link 92. Alternatively, it is possible that various links corresponding with the second interface are nested in time in the multiplexer 90 with a wideband signal. The data which have been nested in time are applied to the optical emitter for producing an optical signal which is fed into a glass fibre 40 through an optical fork arrangement 50 represented symbolically. The optical signals received via the glass fibre in the opposite direction are applied over the fork arrangement 50 to the receiver 54 and converted there into an electric signal. Instead of the optical fork arrangement 50 also two separate glass fibres, one for each direction, can be used.

The line terminating unit 80 further includes a partial circuit 82 which is structured in the same way as the partial circuit 48 or the circuit represented in FIG. 3 respectively, but which is operated in the monitor mode in this case, that is to say, it receives only the data transmitted over the line 47 and evaluates their control information in the control channel. More specifically, from this control information an activating signal is produced on the line 81 via an output of the partial circuit 82 corresponding with the output 51 shown in FIG. 3, which signal activates specifically the optical emitter 52 in the partial circuit 86. With different control information a signal is produced over the line 85 interconnecting the input and output lines of the multiplexer 90 so that, for example, from the block 96 it can be verified whether the transmission link is in working order over the second interface and the multiplexer, so that a reported error then has to be located downstream of this interface.

The glass fibre link 40 ends on the side of the subscriber in a partial circuit 84 which, accordingly, again comprises an optical fork arrangement 401, an optical emitter 402 and an optical receiver 403. A clock recovery circuit 58 generating over line 59 a clock signal which is used in the overall connection unit 98 on the side of the subscriber is further shown to be linked to the receiver. In the terminating unit 80 on the side of the exchange a corresponding clock signal is supplied by the block 96.

The unit 58 further monitors the received data with respect to errors, for example, a violation of code rules, and if an error occurs, generates an error signal which is applied to the partial circuit 42. The latter is further connected to a multiplexer 88 over the lines 41 and 43 representing the second interface, in which multiplexer these data are nested or de-nested in time with a wideband signal over the link 94 in a manner corresponding with that employed in the line terminating unit 80 on the side of the exchange. Over the line 41 an error signal applied through the input 53 is transmitted through a control channel as an error control signal via the multiplexer 88, the glass fibre link 40 and the multiplexer 90 to the partial circuit 48, where an error counter is incremented by means of this error control signal. The count of this error counter can be transmitted, as described hereinbefore, over the line 35 to the sub-circuit 32 and evaluated there.

The partial circuit 42 is connected to the sub-circuit 22 at the subscriber end over the lines 23 and 25 representing the first interface, which sub-circuit leads to the subscriber by means of the link 21.

Since the partial circuit 42 is disposed in the neighbourhood of the optical emitter and receiver, it can generate the required control signals here too. On the line 45 an activating signal is generated switching on the afore-described optical emitter in the partial circuit 84, and over the line 55 a switch 87 can be closed switching the wideband signal on the link 94 in a closed loop, in order to establish, if an error occurs, whether this error is located in this wideband link upstream or downstream of the multiplexer 88. The switch for forming a closed loop is in this case represented only in an exemplary manner and can also be disposed at another position if so required.

In the arrangement represented in FIG. 4 the partial circuit 42 is thus switched to the NT-mode, in which inter alia an error signal supplied through the input 53 is converted into an error control signal in the data stream on the line 41 and incidentally, also the time monitoring circuit 74 represented in FIG. 3 is switched on, whilst the partial circuit 48 on the side of the exchange is switched to the EX-mode, where received error control signals are counted. For that matter, also error signals which are generated in the clock recovery circuit (not shown) connected to the optical receiver 54 can be counted in this partial circuit 48. However, this is only efficient when the spacing between the block 96 and the line terminating unit 80 is not large. Alternatively, it would also be possible that an error signal is applied to the partial circuit 82 which is switched to the monitor mode of operation and produces there at the corresponding location in the control channel an error-control bit for which the outgoing line of the second interface of the partial circuit 82 would have to be connected. As a result of the various potentials of the partial circuits 42, 48 and 82 different configurations may thus be used.

We claim:

1. A circuit arrangement for transmitting information between at least a subscriber terminal and an exchange over a transmission line constructed of a transmitting medium and connected to the terminal and the exchange by means of two adapting circuits, the adapting circuits each comprising two sub-circuits interconnected via a modular first interface and of which the first sub-circuit which is located nearest to the transmission line is essentially the same for the two adapting circuits and effects a physical adaptation to the transmitting medium, wherein the improvement comprises that the first sub-circuit comprises two partial circuits (42, 44; 48, 46; 48, 86; 42, 84) interconnected over a second interface (41, 43; 47, 49) and of which the first partial circuit (42; 48) converts data from the first interface (23, 25; 33, 35) into a binary send signal for the second interface (41, 43; 47, 49) and a binary receive signal of the second interface into a form required for the first interface, and the second partial circuit (44, 46; 84, 86) supplies the binary send signal of the second interface to the transmission line as signals which are transmittable in the transmitting medium and forms the binary receive signal for the second interface from signals present on the transmission line.

2. A circuit arrangement as claimed in claim 1, in which information transmitted over the first interface is grouped in consecutive first frames with various data words, each forming an information channel, of which at least one channel is a control channel which contains control information, wherein the first partial circuit (42; 48) converts for the second interface (41, 43; 45, 47) the information transmitted over the first interface (23, 25; 33, 35) into second frames differing from the first frames, the length of each second frame being a multiple of a length of each first frame, and in which at least part of the control information (M) is suppressed, and in which at least one preset location contains synchronizing information (S).

3. A circuit arrangement as claimed in claim 2, in which each first frame comprises two useful channels and two control channels with equally long data words, the first control channel transmitting first control information for controlling preset functions of the first sub-circuit, wherein each second frame contains
a number of data words of the useful channels and of the second control channel, which number is equal to the quotient of the length of each second frame when divided by the length of each first frame, as well as
synchronizing information.

4. A circuit arrangement as claimed in claim 3, wherein each second frame includes
a synchronizing word which is the same in all frames and which is at least one bit longer than the data words and comprises only bits having one binary value; and
a plurality of bits having the other binary value, which bits are disposed between the data words and between the data words and the synchronizing word.

5. A circuit arrangement as claimed in claim 1, wherein the first partial circuit can be switched into a monitor mode of operation for evaluating only the binary receive signals of the second interface (41; 47).

6. A circuit arrangement as claimed in claim 2, wherein
the first partial circuit (42; 48) includes a connection point (51) for supplying an activating signal when first preset control information occurs in the control channel;
the first sub-circuit includes a further link (45; 51) for transmitting the activating signal between the first and second partial circuits; and
the second partial circuit (44, 46; 84, 86) includes means responsive to the further link for switching on a connection to the transmitting medium.

7. A circuit arrangement as claimed in claim 6, wherein
the first partial circuit generates at least a further control signal, in response to second preset control information in the control channel; and
the second partial circuit comprises a further connection point (55) for receiving the further control signal.

8. A circuit arrangement as claimed in claim 2, wherein
the second partial circuit comprises means for detecting transmission errors and for producing error signals in response to such transmission errors;
the first partial circuit comprises
a separate error input (53), coupled to receive the error signals;
an error counter (76) for counting the error signals received at the error input, which counter is read out over the control channel of the first interface and erased, in response to predetermined control information received via the first interface.

9. A circuit arrangement as claimed in claim 2, wherein
the first partial circuit comprises an error counter for counting error control signals received via the second interface, which counter is read out over the control channel of the first interface and erased, in response to predetermined control information received via the first interface.

10. A circuit arrangement as claimed in claim 2, wherein
a) the second partial circuit comprises means for detecting transmission errors and for producing error signals in response to such transmission errors; and
b) the first partial circuit comprises
i) a separate error input (53), coupled to receive the error signals; and
ii) an error counter (76) for counting
A) the error signals received at the error input, and
B) error control signals received via the second interface
which counter is read out over the control channel of the first interface and erased, in response to predetermined control information received via the first interface.

11. A circuit arrangement as claimed in claim 10 wherein the first partial circuit can be switched into one of three modes of operation:
a monitor mode for evaluating only the binary receive signals of the second interface;
an EX mode for switching off and reading out the error counter; and
an NT mode for causing conversion of an error signal supplied by the second partial circuit into the error control signals on the control channel of the second interface.

12. A sub-circuit for use in a circuit arrangement for transmitting information between at least a subscriber terminal and an exchange over a transmission line constructed of a transmitting medium and connected to the terminal and the exchange by means of two adapting circuits, the adapting circuits each comprising two sub-circuits interconnected via a modular first interface, one of the two sub-circuits being the claimed sub-circuit, which is located nearest to the transmission line and essentially the same for the two adapting circuits and effecting a physical adaptation to the transmitting medium, wherein the claimed sub-circuit comprises two partial circuits (42, 44; 48, 46; 48, 86; 42, 84) interconnected over a second interface (41, 43; 47, 49) and of which the first partial circuit (42; 48) converts data from the first interface (23, 25; 33, 35) into a binary send signal for the second interface (41, 43; 47, 49) and a binary receive signal of the second interface into a form required for the first interface, and the second partial circuit (44, 46; 84, 86) supplies the binary send signal of the second interface to the transmission line as signals which are transmittable in the transmitting medium and forms the binary receive signal for the second interface from signals present on the transmission line.

* * * * *